(12) United States Patent
McMasters et al.

(10) Patent No.: US 9,188,341 B2
(45) Date of Patent: Nov. 17, 2015

(54) FUEL NOZZLE

(75) Inventors: Marie Ann McMasters, Mason, OH (US); Steven Joseph Lohmueller, Reading, OH (US); Randall Charles Boehm, Loveland, OH (US)

(73) Assignee: General Electric Company, Schenectady, NY (US)

( * ) Notice: Subject to any disclaimer, the term of this patent is extended or adjusted under 35 U.S.C. 154(b) by 1280 days.

(21) Appl. No.: 12/101,278

(22) Filed: Apr. 11, 2008

(65) Prior Publication Data

US 2009/0255264 A1    Oct. 15, 2009

(51) Int. Cl.
*F23R 3/28* (2006.01)
*F02K 9/52* (2006.01)
*F23R 3/30* (2006.01)

(52) U.S. Cl.
CPC . *F23R 3/283* (2013.01); *F02K 9/52* (2013.01); *F23R 3/286* (2013.01); *F23D 2900/14004* (2013.01); *F23R 3/30* (2013.01); *F23R 2900/00018* (2013.01); *F23R 2900/03044* (2013.01)

(58) Field of Classification Search
CPC .......... F23D 17/002; F23R 3/30; F23R 3/283; F23R 3/32
USPC .............. 60/747, 748, 746, 737, 740, 739
See application file for complete search history.

(56) References Cited

U.S. PATENT DOCUMENTS

| | | |
|---|---|---|
| 5,057,073 A | 10/1991 | Martin |
| 5,321,951 A | 6/1994 | Falls et al. |
| 5,460,758 A | 10/1995 | Langer et al. |
| 6,070,411 A * | 6/2000 | Iwai et al. ................. 60/737 |
| 6,101,814 A * | 8/2000 | Hoke et al. ................. 60/752 |
| 6,269,540 B1 | 8/2001 | Islam et al. |
| 6,321,541 B1 | 11/2001 | Wrubel et al. |
| 6,355,086 B2 | 3/2002 | Brown et al. |
| 6,381,964 B1 | 5/2002 | Pritchard, Jr. et al. |
| 6,389,815 B1 | 5/2002 | Hura et al. |
| 6,418,726 B1 * | 7/2002 | Foust et al. ................ 60/776 |
| 6,453,660 B1 * | 9/2002 | Johnson et al. .......... 60/39.821 |
| 6,487,861 B1 | 12/2002 | Carita et al. |
| 6,523,350 B1 | 2/2003 | Mancini et al. |
| 6,634,175 B1 | 10/2003 | Kawata et al. |
| 6,672,066 B2 | 1/2004 | Wrubel et al. |
| 6,676,892 B2 | 1/2004 | Das et al. |
| 6,705,383 B2 | 3/2004 | Beeck et al. |

(Continued)

FOREIGN PATENT DOCUMENTS

WO    8802677 A    4/1988

OTHER PUBLICATIONS

PCT/US2009/039485, Search Report and Written Opinion, Jul. 17, 2009.

(Continued)

*Primary Examiner* — Gerald L Sung
(74) *Attorney, Agent, or Firm* — General Electric Company; Pamela A. Kachur

(57) ABSTRACT

A fuel distributor is disclosed comprising a body having a unitary construction, a fuel conduit located within the body, a fuel flow path located within the body that is oriented in a circumferential direction around an axis and in flow communication with the fuel conduit, and at least one orifice located in the body in flow communication with the fuel flow path such that a fuel entering the fuel conduit exits through the orifice.

11 Claims, 9 Drawing Sheets

(56) References Cited

U.S. PATENT DOCUMENTS

| | | | |
|---|---|---|---|
| 6,718,770 B2 | 4/2004 | Laing et al. | |
| 6,865,889 B2 | 3/2005 | Mancini et al. | |
| 6,871,501 B2* | 3/2005 | Bibler et al. | 60/772 |
| 6,951,227 B1 | 10/2005 | Su | |
| 7,631,500 B2* | 12/2009 | Mueller et al. | 60/748 |
| 7,788,927 B2 | 9/2010 | McMasters et al. | |
| 7,841,368 B2 | 11/2010 | McMasters et al. | |
| 2002/0038549 A1* | 4/2002 | Ebel | 60/748 |
| 2002/0092302 A1* | 7/2002 | Johnson et al. | 60/737 |
| 2003/0221429 A1* | 12/2003 | Laing et al. | 60/740 |
| 2004/0016239 A1 | 1/2004 | Fabian et al. | |
| 2004/0148938 A1* | 8/2004 | Mancini et al. | 60/740 |
| 2004/0237532 A1* | 12/2004 | Howell et al. | 60/748 |
| 2005/0133527 A1 | 6/2005 | Dullea et al. | |
| 2005/0268618 A1* | 12/2005 | Johnson et al. | 60/776 |
| 2007/0017224 A1 | 1/2007 | Li et al. | |
| 2007/0028618 A1 | 2/2007 | Hsiao et al. | |
| 2007/0028620 A1* | 2/2007 | McMasters et al. | 60/748 |
| 2007/0141375 A1 | 6/2007 | Budinger et al. | |
| 2007/0163114 A1 | 7/2007 | Johnson | |
| 2008/0078181 A1* | 4/2008 | Mueller et al. | 60/776 |
| 2009/0255102 A1 | 10/2009 | McMasters et al. | |
| 2009/0255116 A1 | 10/2009 | McMasters et al. | |
| 2009/0255118 A1 | 10/2009 | Kastrup et al. | |
| 2009/0255119 A1 | 10/2009 | McMasters et al. | |
| 2009/0255120 A1 | 10/2009 | McMasters et al. | |
| 2009/0255257 A1 | 10/2009 | McMasters et al. | |
| 2009/0255259 A1 | 10/2009 | Kastrup et al. | |
| 2009/0255260 A1 | 10/2009 | McMasters et al. | |
| 2009/0255261 A1 | 10/2009 | McMasters et al. | |
| 2009/0255262 A1 | 10/2009 | McMasters et al. | |
| 2009/0255264 A1 | 10/2009 | McMasters et al. | |
| 2009/0255265 A1 | 10/2009 | McMasters et al. | |
| 2009/0256003 A1 | 10/2009 | McMasters et al. | |
| 2009/0256007 A1 | 10/2009 | McMasters et al. | |
| 2010/0065142 A1 | 3/2010 | McMasters et al. | |

OTHER PUBLICATIONS

Simchi, "The Role of Particle Size on the laser Sintering of Iron Powder", Metallurgical and Materials Transactions B, vol. No. 35B, pp. 937-948, Oct. 2004.

* cited by examiner

FUEL NOZZLE

BACKGROUND OF THE INVENTION

This invention relates generally to combustors, and more specifically to fuel nozzle components having a unitary construction and fuel nozzle assemblies using such components.

Turbine engines typically include a plurality of fuel nozzles for supplying fuel to the combustor in the engine. The fuel is introduced at the front end of a burner in a highly atomized spray from a fuel nozzle. Compressed air flows in around the fuel nozzle and mixes with the fuel to form a fuel-air mixture, which is ignited by the burner. Because of limited fuel pressure availability and a wide range of required fuel flow, many fuel injectors include pilot and main nozzles, with only the pilot nozzles being used during start-up, and both nozzles being used during higher power operation. The flow to the main nozzles is reduced or stopped during start-up and lower power operation. Such injectors can be more efficient and cleaner-burning than single nozzle fuel injectors, as the fuel flow can be more accurately controlled and the fuel spray more accurately directed for the particular combustor requirement. The pilot and main nozzles can be contained within the same nozzle assembly or can be supported in separate nozzle assemblies. These dual nozzle fuel injectors can also be constructed to allow further control of the fuel for dual combustors, providing even greater fuel efficiency and reduction of harmful emissions. The temperature of the ignited fuel-air mixture can reach an excess of 3500° F. (1920° C.). It is therefore important that the fuel supply and distribution systems are substantially leak free and are protected from the flames.

Conventional combustor components such as, for example, fuel nozzles, are generally expensive to fabricate and/or repair because the conventional fuel nozzle designs include a complex assembly and joining of more than thirty components. More specifically, the use of braze joints can increase the time needed to fabricate such components and can also complicate the fabrication process for any of several reasons, including: the need for an adequate region to allow for braze alloy placement; the need for minimizing unwanted braze alloy flow; the need for an acceptable inspection technique to verify braze quality; and, the necessity of having several braze alloys available in order to prevent the re-melting of previous braze joints. Moreover, numerous braze joints may result in several braze runs, which may weaken the parent material of the component. The presence of numerous braze joints can undesirably increase the weight and manufacturing cost of the component.

Accordingly, it would be desirable to have combustor components such as, for example, fuel nozzle components, that have unitary construction for reducing potential leakage and other undesirable effects described earlier. It is desirable to have a fuel nozzle that has fewer components using a unitary construction of complex components to reduce the cost and for ease of assembly. It is desirable to have a method of manufacturing unitary combustor components having complex three-dimensional geometries.

BRIEF DESCRIPTION OF THE INVENTION

The above-mentioned need or needs may be met by exemplary embodiments which provide a combustor component comprising a body having a unitary construction, a fuel conduit located within the body, a fuel flow path located within the body that is oriented in a circumferential direction around an axis and in flow communication with the fuel conduit, and at least one orifice located in the body in flow communication with the fuel flow path such that a fuel entering the fuel conduit exits through the orifice.

In another embodiment, the combustor component described above further comprises a centerbody having a unitary construction with the body, the centerbody having an annular wall surrounding the body and having a circumferential row of openings corresponding to a plurality of orifices arranged circumferentially around the axis.

In another aspect of the invention, a fuel nozzle comprises an annular fuel distributor having a unitary construction and having at least one fuel conduit within the body, an annular air-swirler located inside the unitary fuel distributor and a fuel injector located inside the annular air swirler capable of injecting a stream of fuel.

In another aspect of the invention, an air-swirler comprises an annular body, a row of outer vanes and a row of inner vanes on the body arranged circumferentially around an axis and an annular splitter located on the body, wherein the annular body, the row of outer vanes, the row of inner vanes and the annular splitter have a unitary construction.

In another aspect of the invention, a method for fabricating a unitary component for a combustor comprises the steps of determining three-dimensional information of the unitary component, converting the three-dimensional information into a plurality of slices that each define a cross-sectional layer of the unitary component, and successively forming each layer of the unitary component by fusing a metallic powder using laser energy.

In another aspect of the invention, a combustor component comprises a body having a unitary construction wherein the body is made by using a rapid manufacturing process.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
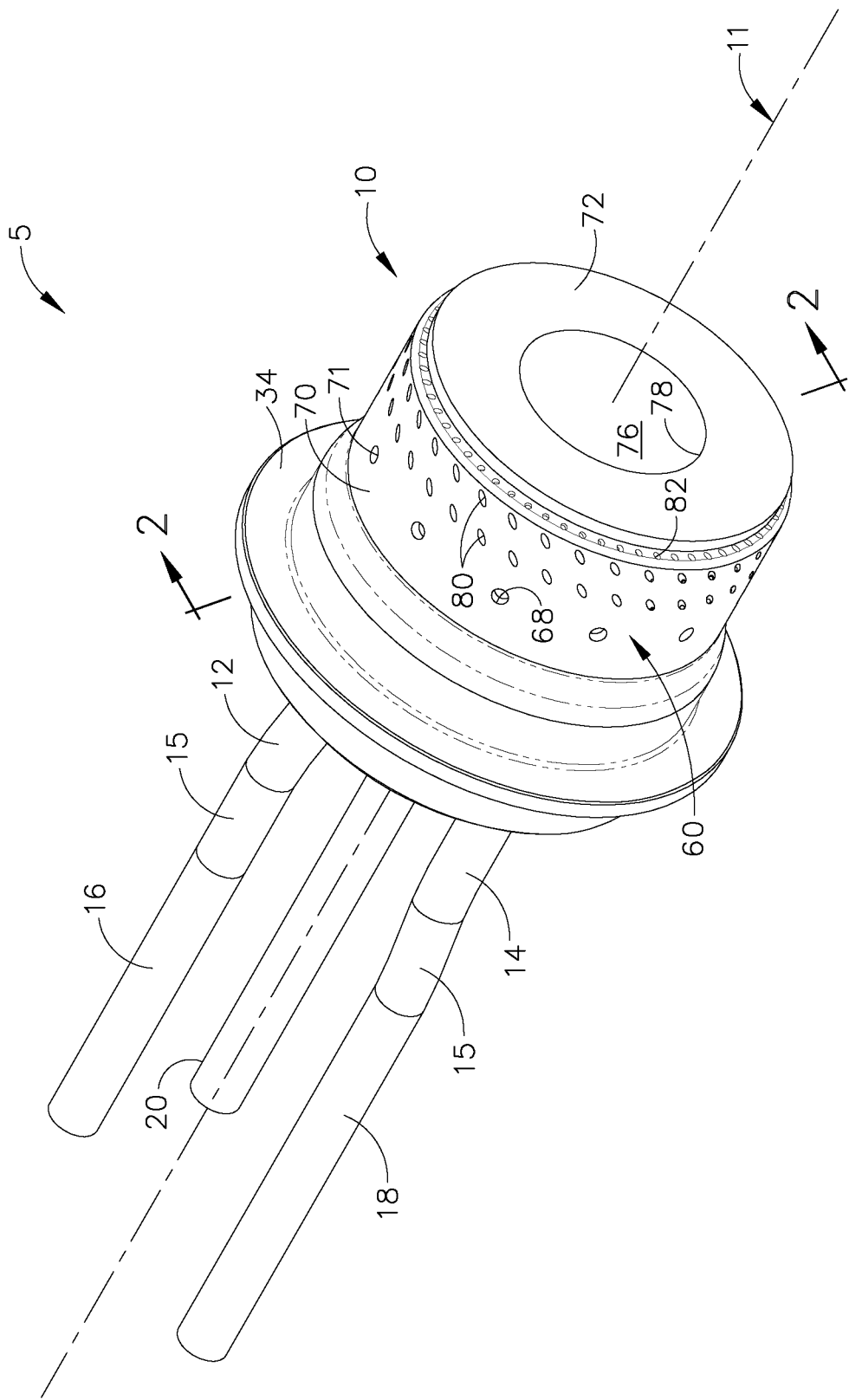
FIG. 1 is an isometric view of a fuel nozzle according to an exemplary embodiment of the present invention.

Referring to the drawings wherein identical reference numerals denote the same elements throughout the various views, FIG. 1 shows a fuel nozzle 5 according to an exemplary embodiment of the present invention. The fuel nozzle has an axis 11, a fuel nozzle tip 10 comprising a fuel supply conduit 12, 14 that receive and supply fuel into the fuel nozzle tip 10, a fuel distributor 60 that distributes the fuel, a center body 70, a mixing chamber 76 wherein fuel and air are mixed, and a heat shield 72. In the exemplary embodiment shown in FIG. 1, two fuel supply conduits 12, 14 are shown, for example, that are coupled to corresponding fuel supply lines 16, 18. A third supply line 20 supplies fuel to a pilot fuel injector 22 that is located along the axis inside the fuel nozzle tip 10.

Figure 2:
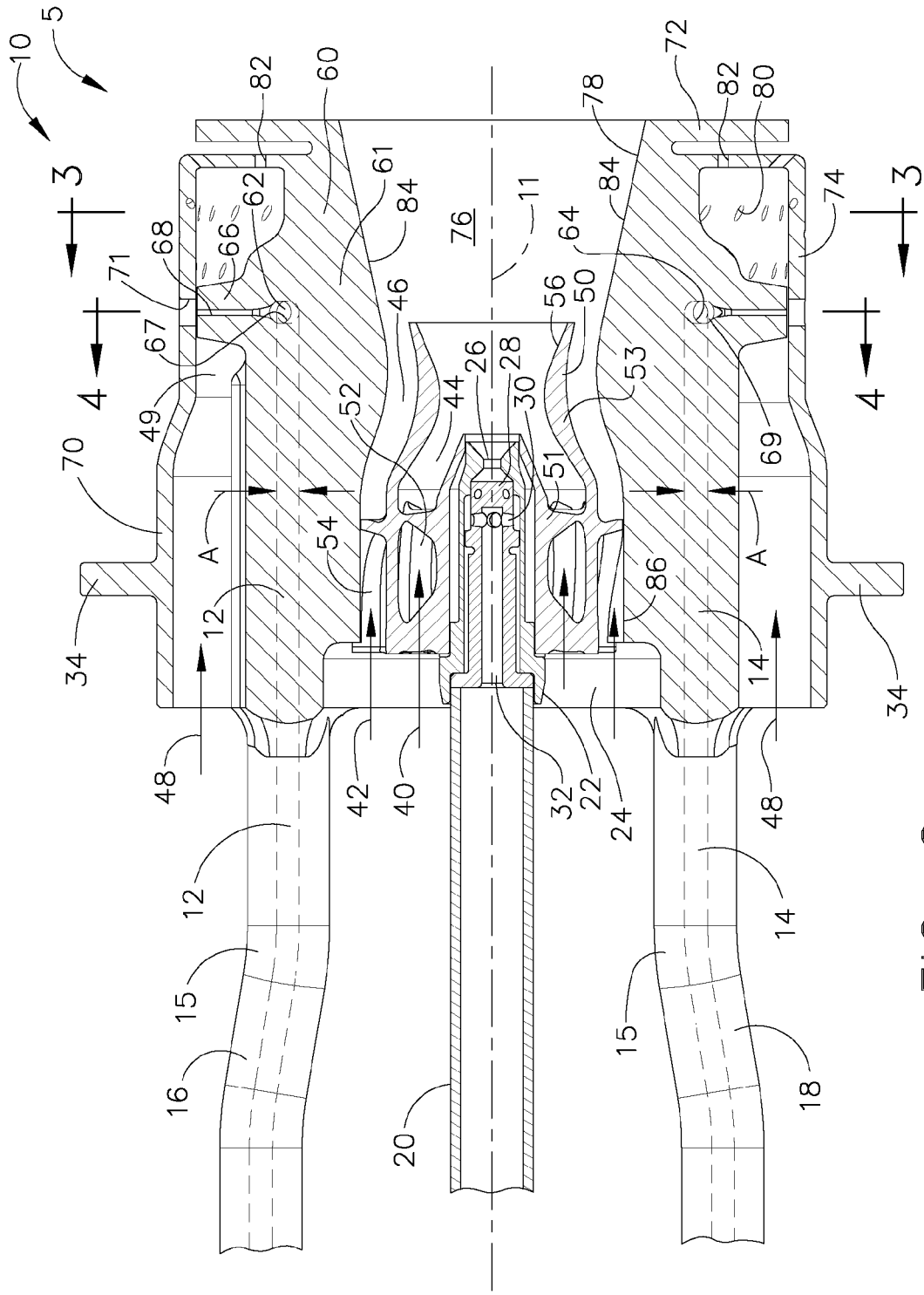
FIG. 2 is an axial cross sectional view of the exemplary embodiment of the present invention shown in FIG. 1.

The components and features of the exemplary embodiment of the present invention shown in FIG. 1 are more clearly seen in the axial cross sectional view shown in FIG. 2. FIG. 2 shows the fuel nozzle 5 having a unitary fuel distributor 60, a unitary air-swirler 50, and a pilot fuel injector 22. The term "unitary" is used in this application to denote that the associated component is made as a single piece during manufacturing. Thus, a unitary component has a monolithic construction for the entire component, and is different from a component that has been made from a plurality of component pieces that have been joined together to form a single component.

The fuel nozzle 5 is an example of a combustor component. It can be used to introduce fuel into a combustor environment, such as for example, in combustion rig tests, in gas turbine engines, or any combustors that use a fuel-air mixture for igniting a flame during combustion. The fuel is supplied to nozzle 5 using one or more fuel supply lines, such as for example, shown as items 16, 18 and 20 in FIG. 2. The fuel supply lines 16, 18 are connected using conventional coupling means to corresponding fuel conduits in the fuel nozzle 5. In the exemplary embodiment shown in FIG. 2, two fuel conduits 12, 14 are shown as having a generally axial orientation, substantially parallel to the axis 11, having a cross sectional area "A". The fuel conduits 12, 14 are formed within the body 61 of the unitary fuel distributor 60. The body 61 of the unitary fuel distributor has an interior portion that is axisymmetric about the axis 11. The interior portion of the body 61 has a substantially cylindrical portion 86 that can hold an air-swirler 50 described subsequently herein, and a conical portion 84 that is located axially forward from the cylindrical portion 86. The conical portion 84 has a venturi 78 that forms a part of a mixing chamber 76 wherein the pilot fuel and air are mixed prior to combustion. When ignited, a flame is formed axially in front of the exit plane of the venturi 78.

Figure 4:
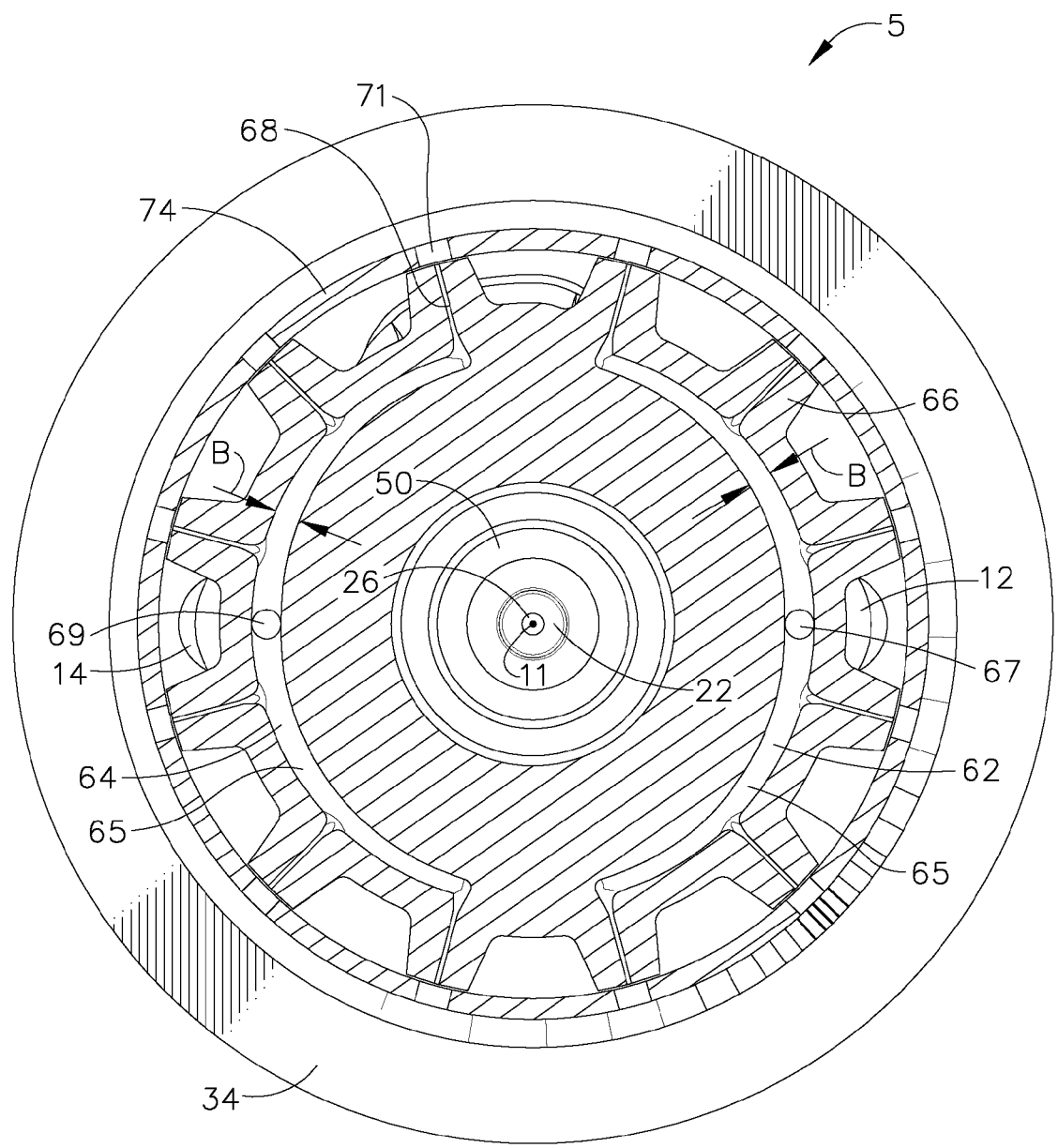
FIG. 4 is a radial cross sectional view of the exemplary embodiment of the present invention shown in FIG. 1.
Figure 5:
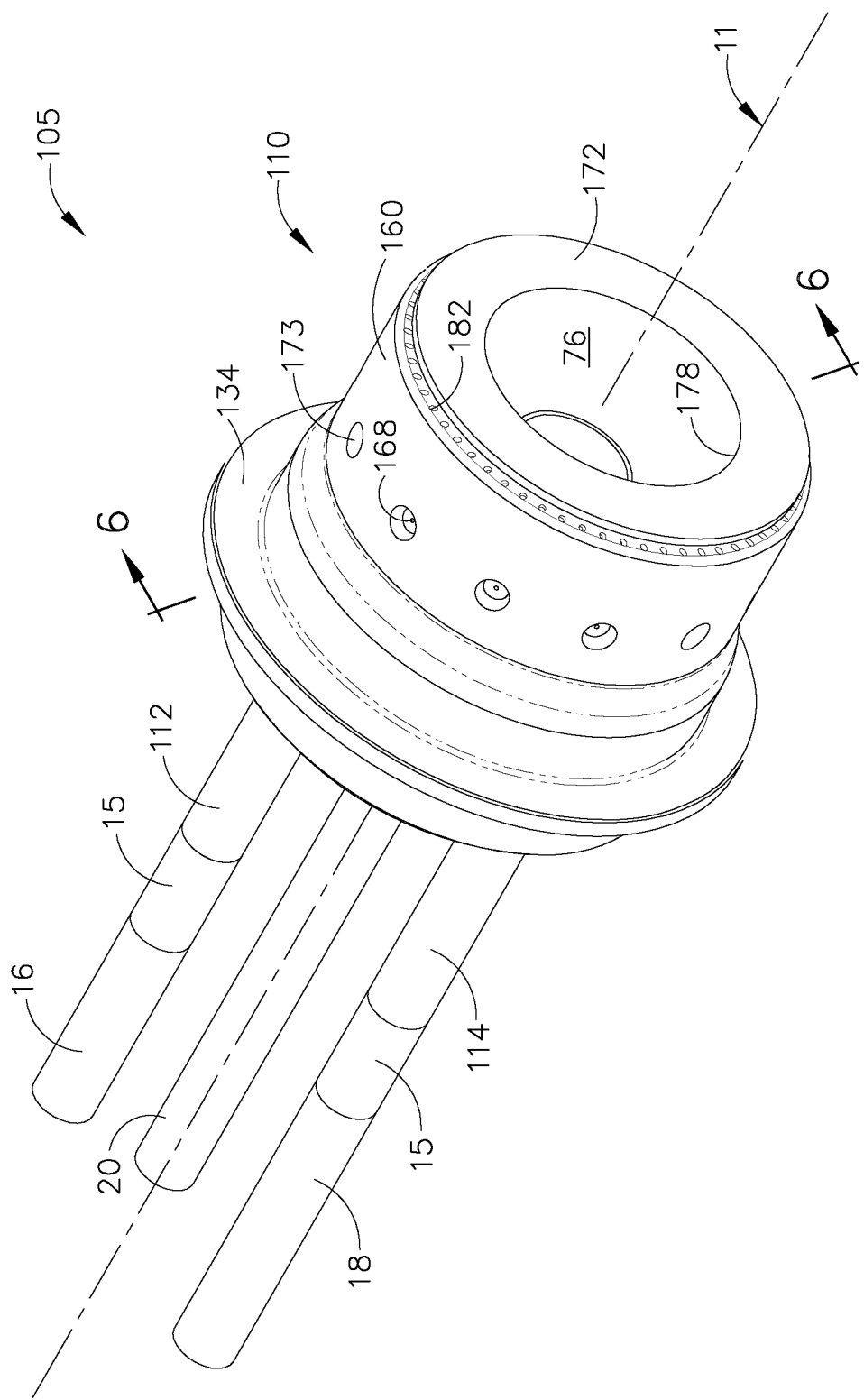
FIG. 5 is an isometric view of a fuel nozzle according to an alternative embodiment of the present invention.

The fuel entering the fuel conduits 12, 14 enters a main fuel circuit 65 (see FIG. 4) formed within the body 61 of the unitary fuel distributor 60. In the exemplary embodiments shown herein, the main fuel circuit 65 has a generally circumferential orientation around the axis 11, and comprises a first fuel path 62 and a second fuel path 64, as shown in FIG. 2 and FIG. 4. Fuel from the first fuel conduit 12 flows into the first fuel path 62 at a first fuel inlet 67 and fuel from the second fuel conduit 14 flows into the second fuel path 64 at a second fuel inlet 69. Although two axial fuel conduits 12, 14 and corresponding circumferential fuel paths 62, 64 are shown in the embodiments described herein, it is understood by those skilled in the art that it is possible to have other configurations for the fuel conduits and fuel paths and other orientations in the unitary fuel distributor 60 and are within the scope of the present invention.

As shown in FIG. 2 and FIG. 4, fuel from the main fuel circuit 65 is directed outward from the fuel distributor 60 by a plurality of fuel orifices 68 that are located within the body 61. In the exemplary embodiment shown in FIGS. 2, 3 and 4, each fuel orifice 68 is located inside a fuel post 66. The fuel posts 66 are formed as a part of the body 61. Each fuel orifice 68 is in flow communication with a fuel path 62, 64 of the main fuel circuit 65. Pressurized fuel from the main fuel circuit 65 enters the orifices 68 and is ejected out of the fuel nozzle 5. As shown in FIG. 4, the main fuel circuit 65 has a cross section area (denoted as "B") that varies in the circumferential direction. The variation of cross section area "B" is sized using known methods so as to maintain a constant pressure within the main fuel circuit 65 as the fuel flows from the fuel inlets 67, 69 to a plurality of orifices 68 that are arranged in the circumferential direction in the body 61.

In the exemplary embodiment of a fuel nozzle 5 shown in FIG. 2, the distributor body 61 comprises an annular center body 70 having a unitary construction with the body 61. The centerbody 70 has an annular outer wall 74 that surrounds the body 61 and forms an annular passage 49 for air flow. A feed air stream 48 for cooling the fuel nozzle 5 enters the air flow passage 49 between the centerbody outer wall 74 and the distributor body 61 and flows past the fuel posts, facilitating the cooling of the fuel orifices 68. The outer wall 74 has a plurality of openings 71 that are arranged in the circumferential direction, corresponding to the circumferential row of fuel orifices 68. Fuel ejected from the orifices 68 exit from the fuel nozzle 5 through the openings 71 and enter the combustor. It is possible to have a small gap between the inner diameter of the outer wall 74 and the outer end of the fuel posts 66. In the exemplary embodiment shown in FIGS. 1 and 4, this gap ranges between about 0.000 inches to about 0.010 inches.

Figure 3:
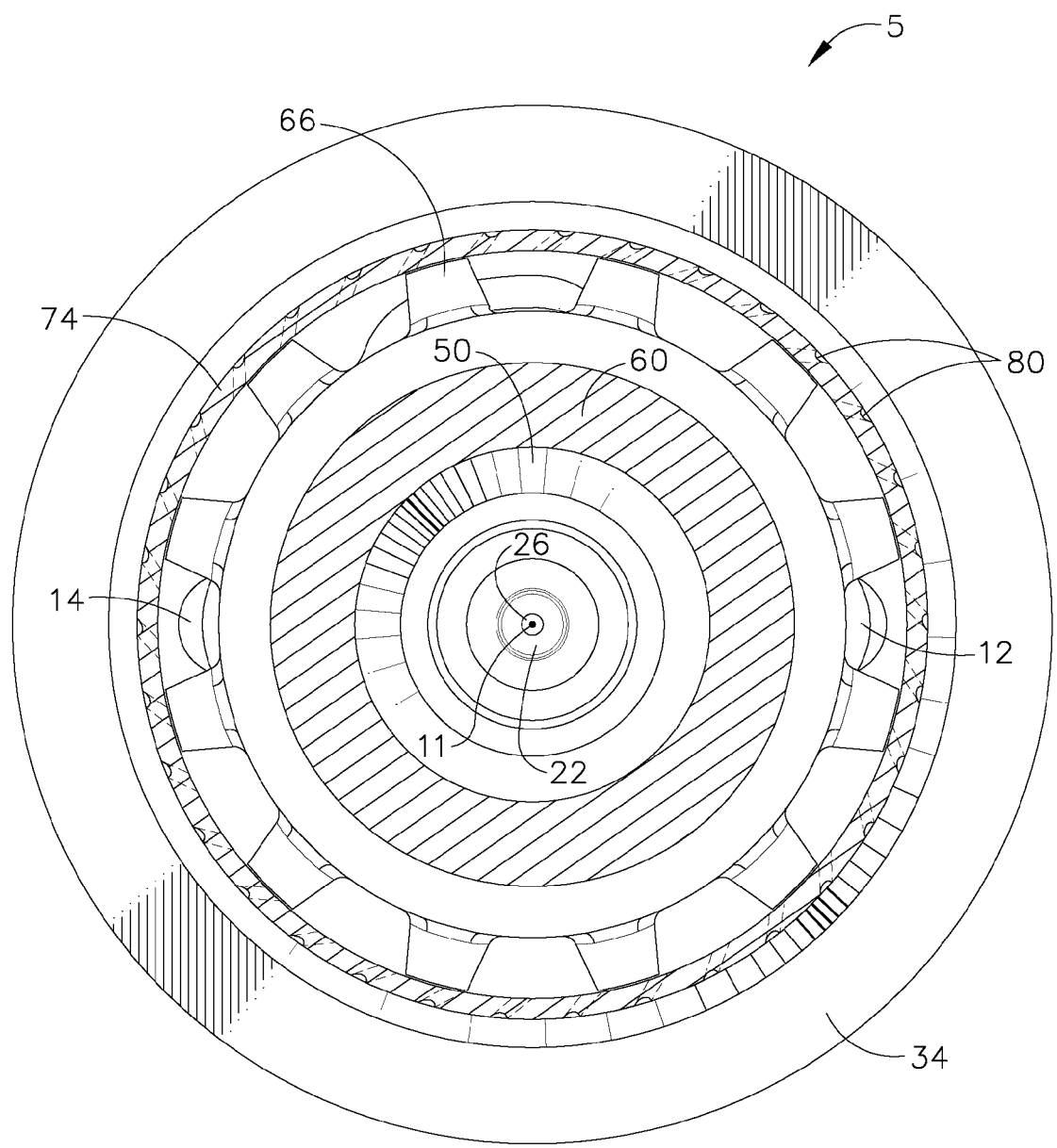
FIG. 3 is a radial cross sectional view of the exemplary embodiment of the present invention shown in FIG. 1.

In the exemplary embodiment shown in FIG. 2, the centerbody wall 70 is cooled by a multi-hole cooling system which passes a portion of the feed air stream 48 entering the fuel nozzle 5 through one or more circumferential rows of openings 80. The multi-hole cooling system of the centerbody may typically use one to four rows of openings 80. The openings 80 may have a substantially constant diameter. Alternatively, the openings 80 may be diffuser openings that have a variable cross sectional area. In FIG. 2 two circumferential rows of openings 80 are shown, each row having between 60 to 80 openings and each opening having a diameter varying between about 0.020 inches and 0.030 inches. As shown in FIGS. 1, 2, and 3, the openings 80 can have a complex orientation in the axial, radial and tangential directions within the outer wall 74. Additional rows of cooling holes 82 arranged in the circumferential direction in the centerbody 70 are provided to direct the feed air stream 48 toward other parts of the fuel distributor 60. In the exemplary embodiment shown in FIGS. 1 and 2, the body 61 comprises an annular heat shield 72 located at one end of the body 61. The heat shield 72 shields the body 61 from the flame that is formed during combustion in the combustor. The heat shield 72 is cooled by one or more circumferential rows of holes 82 having an axial orientation as shown in FIGS. 1 and 2 that direct cooling air that impinges on the heat shield 72. For the unitary construction of the fuel distributor 60, the holes typically have a diameter of at least 0.020 inches. In the exemplary and alternative embodiments shown herein, a circumferential row having between 50 to 70 holes, with a hole size between about 0.026 inches to about 0.030 inches was used.

The exemplary embodiments of the present invention shown herein comprise a unitary air-swirler 50 that receives an air stream and swirls it in the axial and circumferential directions. The unitary air-swirler 50 has a plurality of inner vanes 52 arranged circumferentially around a swirler body 51. The inner vanes 52 extend in the radial direction between the body 51 and an annular splitter 53. The unitary air-swirler 50 has a plurality of outer vanes 54 arranged circumferentially on the splitter 53 and extend radially outward from the splitter 53. The splitter 53 splits the air stream entering the fuel nozzle 5 into an inner air stream 40 and an outer air stream 42. The inner air stream 40 is swirled by the inner vanes 52 and the outer air stream 42 is swirled by the outer vanes 54. It is possible, by appropriate orientation of the vanes 52, 54, to swirl the inner air stream 40 and outer air stream 42 in the same circumferential direction ("co-swirl") or in the opposite circumferential directions. In the exemplary embodiments shown herein, the inner air stream 40 and the outer air stream 42 are co-swirled. The swirled inner air stream 40 exiting from the inner vanes 52 enters an inner passage 44 that is bounded by the interior of the annular splitter 53. From the inner passage 44, the swirling air enters a diverging portion 56 of the splitter 53 and mixes with a spray of fuel ejected by the pilot fuel injector 22. A conventional fuel injector 22 is shown in FIG. 2, comprising a fuel-swirler 28 and a pilot fuel injector orifice 26. The swirled outer air stream leaving the outer vanes 54 enters an annular outer passage 46 formed between the radially outer portion of the splitter 53 and the radially interior side of the unitary fuel distributor body 61. The swirled air streams and fuel ejected from the pilot fuel injector 22 mix within a mixing chamber 76 formed by a venturi 78 inside the distributor body 61. The fuel-air mixture thus formed moves axially forward and exits the fuel nozzle 5 and ignited to create a combustion flame. As described previously, the fuel nozzle body 61 has a heat shield 72 located at the axially aft end of the body 61 to protect the fuel nozzle from the flame.

Figure 6:
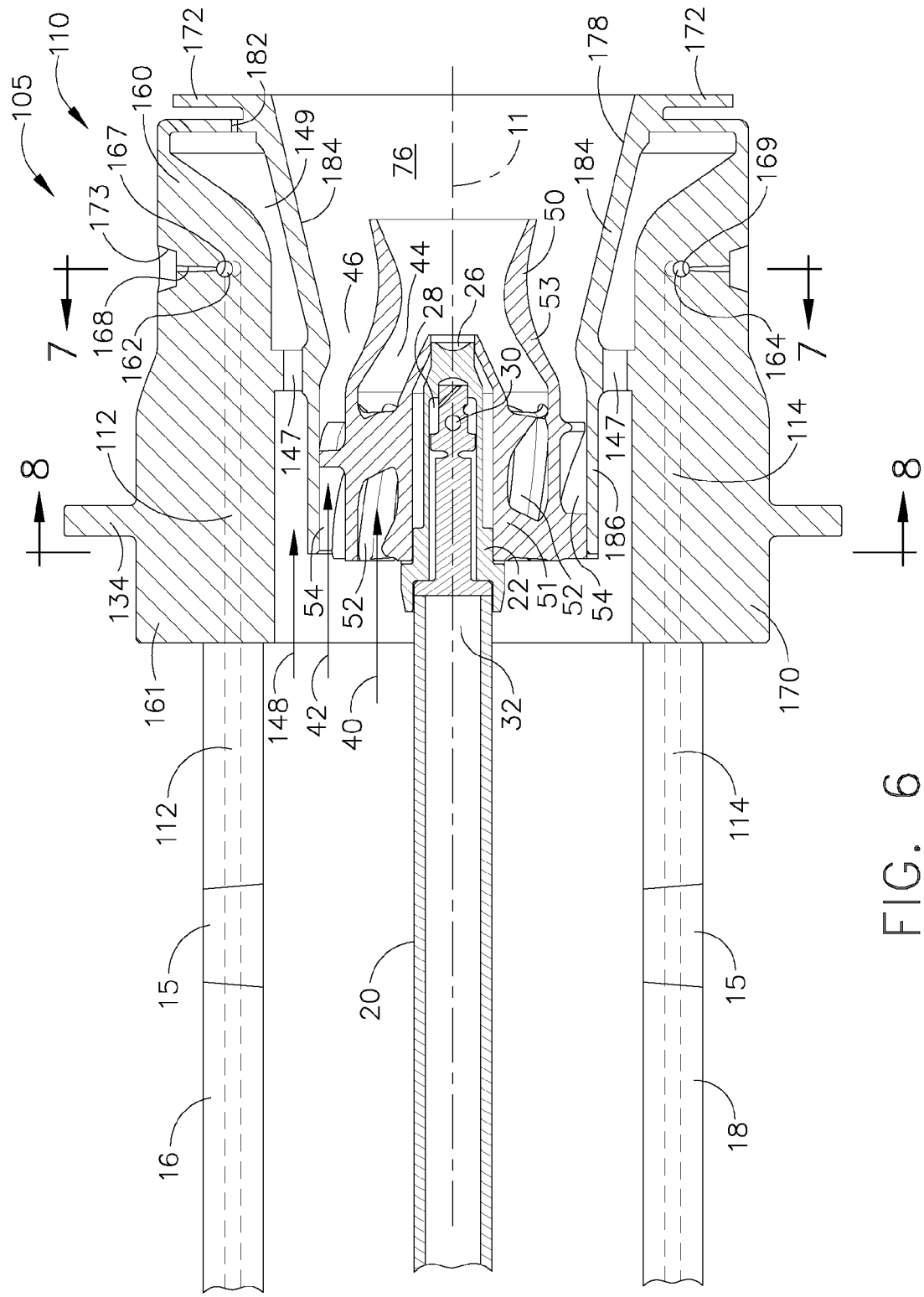
FIG. 6 is an axial cross sectional view of the alternative embodiment of the present invention shown in FIG. 5.
Figure 7:
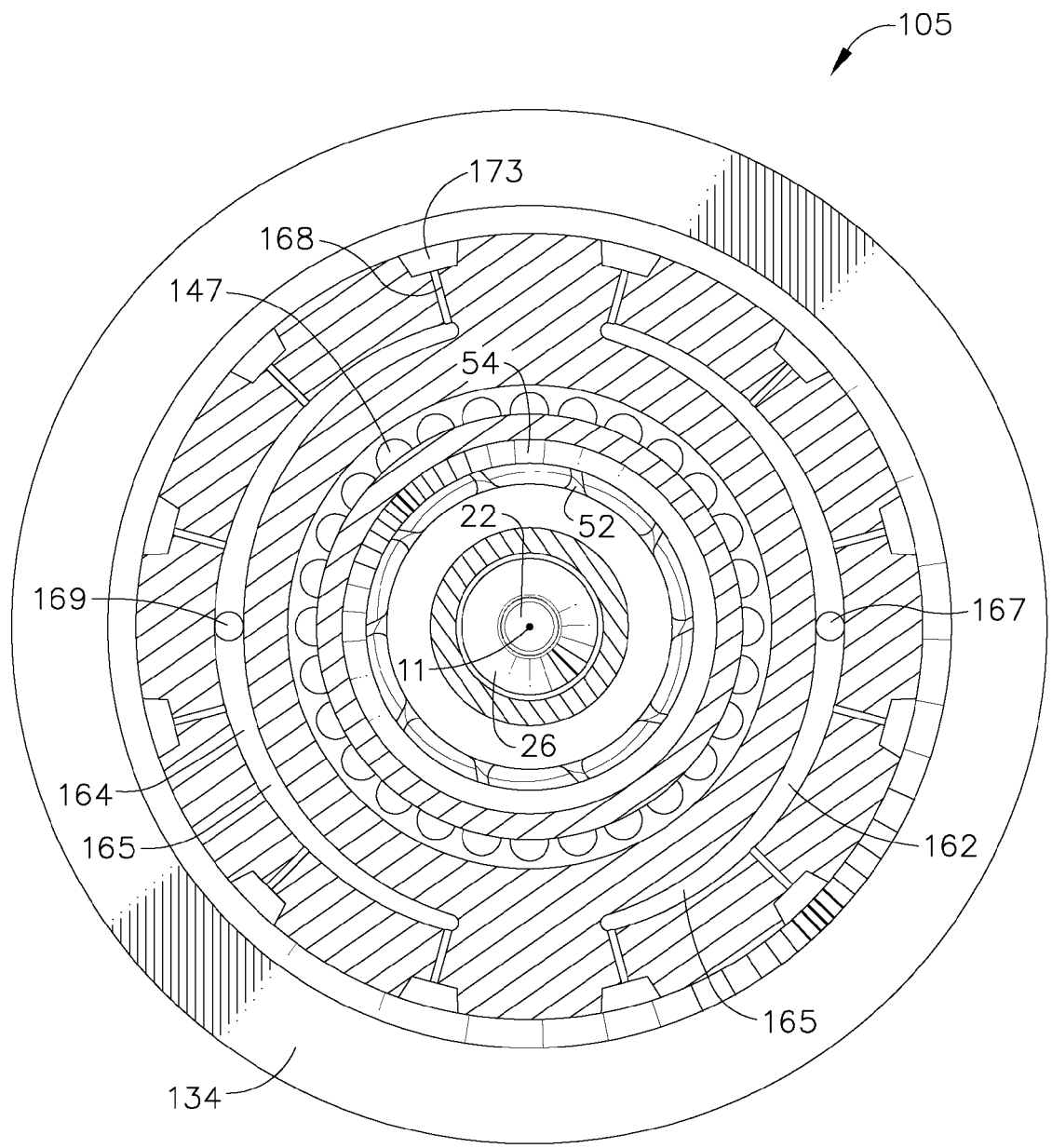
FIG. 7 is a radial cross sectional view of the alternative embodiment of the present invention shown in FIG. 5.
Figure 8:
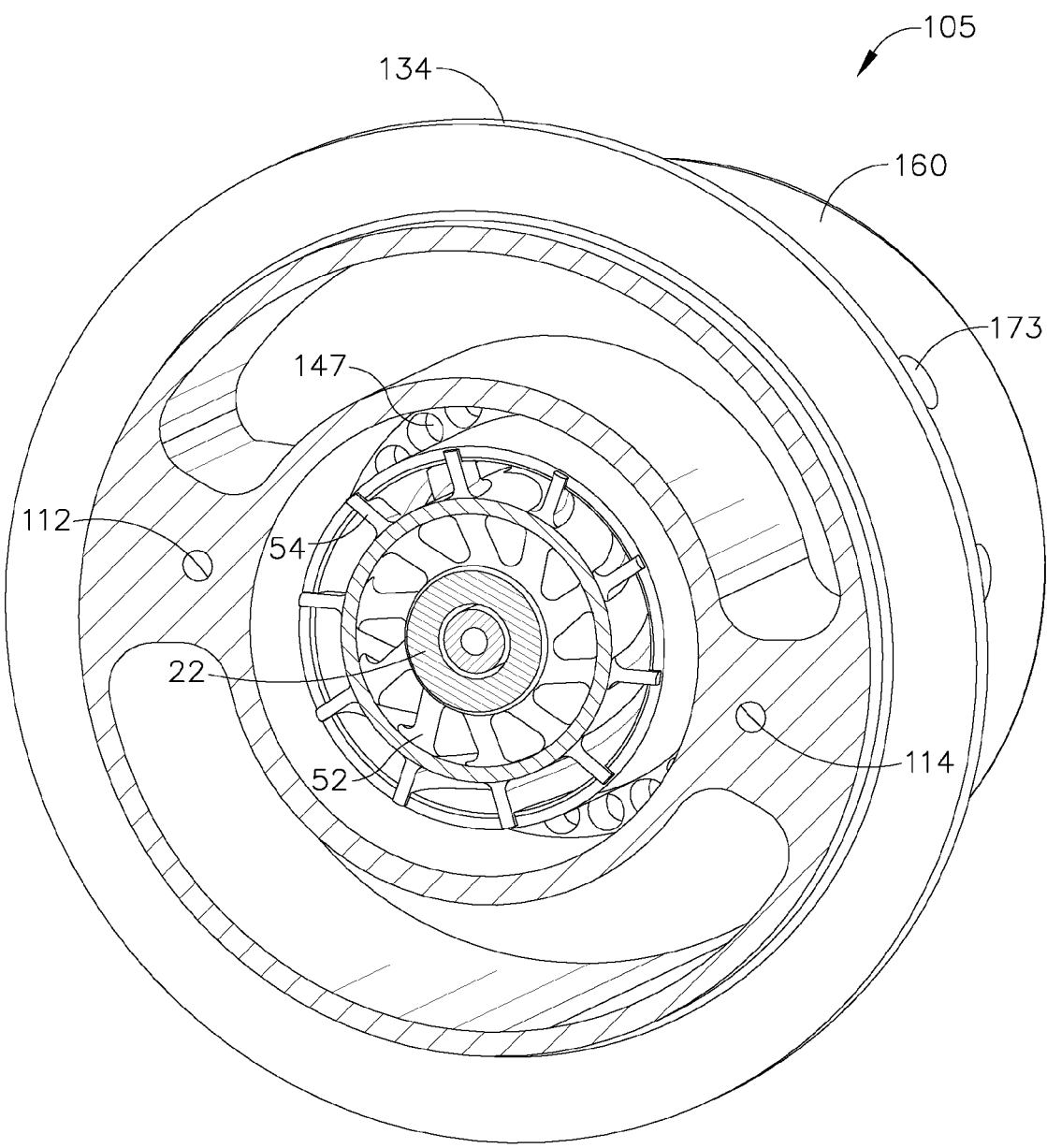
FIG. 8 is an isometric view of a cross section of the alternative embodiment of the present invention shown in FIG. 5.

FIG. 5, FIG. 6, FIG. 7 and FIG. 8 show an alternative embodiment of the present invention. This alternative embodiment uses a conventional fuel injector 22 and a unitary air-swirler 50 similar to the ones described previously. The unitary fuel distributor 160 is different from the previously described embodiment shown in FIG. 1. The unitary fuel distributor 160 has a body 161 having fuel conduits 112, 114 and a main fuel circuit 165 in flow communication with the fuel conduits. As shown in FIG. 7, the main fuel circuit 165 comprises a first fuel path 162 and a second fuel path 164. A plurality of fuel orifices 168 that are arranged circumferentially eject the fuel from the fuel paths 162, 164 into a plurality of recesses 173 and out of the fuel nozzle 105. In the alternative embodiment shown herein, a feed air stream 148 enters the unitary fuel distributor body 161 through a circumferential row of openings 147 and enters an annular air passage 149 surrounding a venturi 178. An annular heat shield 172 is located at the axially aft end of the venturi 178. The annular heat shield is cooled by impingement using cooling air directed through a circumferential row of cooling holes 182. The unitary fuel distributor body 161 has a cylindrical portion 186 that is located axially forward from the venturi 178. A unitary air-swirler 50, similar to the one described previously is located within the cylindrical portion 186. As described previously, a conventional fuel injector 22 is located within the unitary air-swirler 50. FIG. 7 shows a radial cross sectional view of the alternative embodiment of the fuel nozzle 105. FIG. 8 shows an isometric view of a cross section of the alternative embodiment of the fuel nozzle 105.

The unitary fuel distributor 60 of the exemplary embodiment shown in FIG. 2 and the unitary fuel distributor 160 of the alternative embodiment shown in FIG. 6 can be made using rapid manufacturing processes such as Direct Metal Laser Sintering (DMLS), Laser Net Shape Manufacturing (LNSM), electron beam sintering and other known processes in the manufacturing. DMLS is a preferred method of manufacturing unitary fuel nozzle components such as the fuel distributors 60, 160 and swirler 50 described herein.

Figure 9:
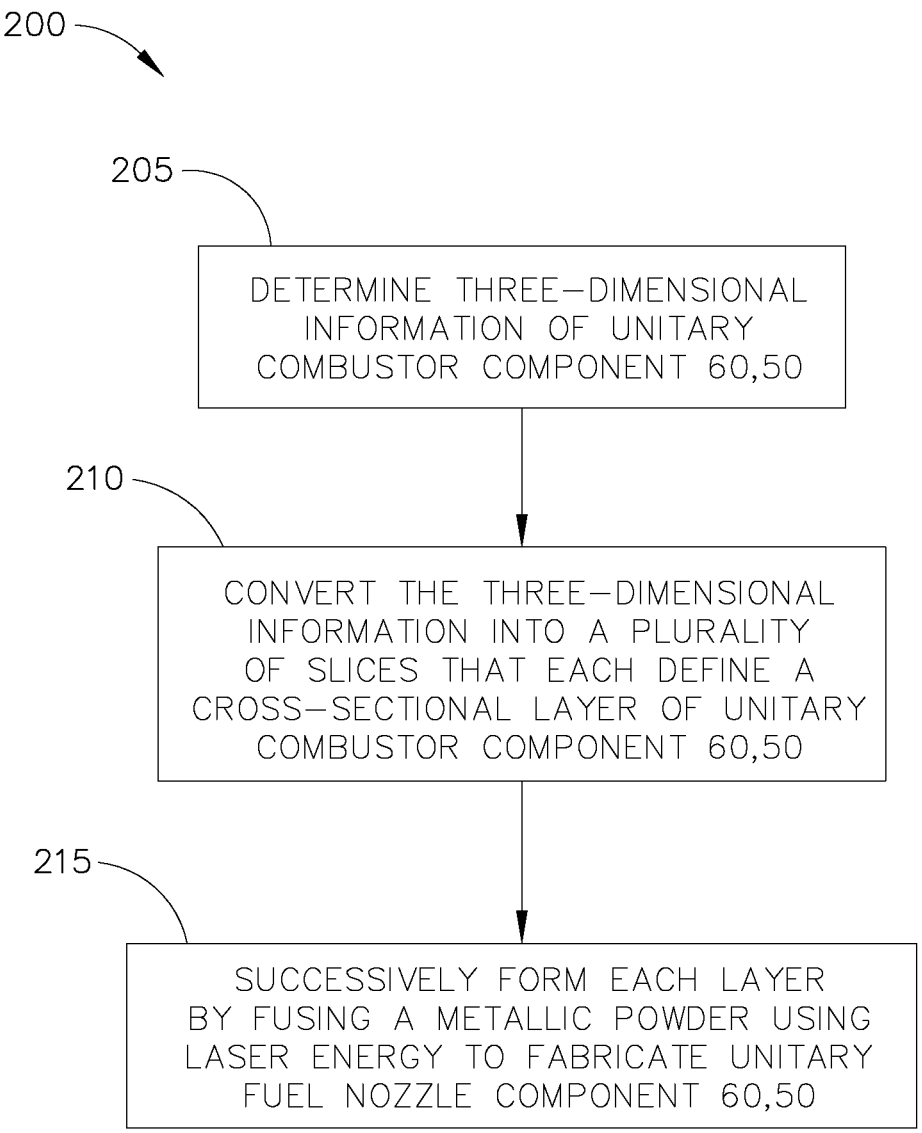
FIG. 9 is a flow chart illustrating an exemplary embodiment of a method for fabricating unitary fuel nozzle components shown in FIG. 2 and FIG. 6

FIG. 9 is a flow chart illustrating an exemplary embodiment of a method 200 for fabricating unitary fuel nozzle components described herein. such as the fuel distributors 60, 160 and air-swirler 50 shown in FIG. 2 and FIG. 6. Method 200 includes fabricating unitary fuel distributor 60 (shown in FIG. 2), unitary fuel distributor 160 (shown in FIG. 6) and air-swirler 50 (shown in FIG. 2 and FIG. 6) using Direct Metal Laser Sintering (DMLS). DMLS is a known manufacturing process that fabricates metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished. Each layer of the component is formed by fusing a metallic powder using a laser.

Accordingly, method 200 includes the step 205 of determining three-dimensional information of each unitary fuel nozzle component 50, 60, 160 (shown in FIG. 2 and FIG. 6) and the step 210 of converting the three-dimensional information into a plurality of slices that each define a cross-sectional layer of the unitary fuel nozzle component 50, 60, 160. Each unitary fuel nozzle component 50, 60, 160 is then fabricated using DMLS, or more specifically each layer is successively formed 215 by fusing a metallic powder using laser energy. Each layer has a size between about 0.0005 inches and about 0.001 inches. Unitary fuel nozzle components 50, 60, 160 may be fabricated using any suitable laser sintering machine. Examples of suitable laser sintering machines include, but are not limited to, an EOSINT® M 270 DMLS machine, a PHENIX PM250 machine, and/or an EOSINT® M 250 Xtended DMLS machine, available from EOS of North America, Inc. of Novi, Mich. The metallic powder used to fabricate unitary fuel nozzle components 50, 60, 160 is preferably a powder including cobalt chromium, but may be any other suitable metallic powder, such as, but not limited to, HS1888 and INCO625. The metallic powder can have a particle size of between about 10 microns and 74 microns, preferably between about 15 microns and about 30 microns.

Although the methods of manufacturing unitary combustor components such as, for example, fuel nozzle components, have been described herein using DMLS as the preferred method, those skilled in the art of manufacturing will recognize that any other suitable rapid manufacturing methods using layer-by-layer construction or additive fabrication can also be used. These alternative rapid manufacturing methods include, but not limited to, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

When introducing elements/components/etc. of the methods and/or fuel nozzles described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustor component comprising:
   a distributor body having an axis and an annular outer surface;
   one or more fuel conduits located within the distributor body, the one or more fuel conduits oriented in a substantially axial direction;
   a main fuel circuit located within the distributor body, the main fuel circuit oriented in a circumferential direction around the axis and communicating with each of the one or more fuel conduits at a corresponding fuel inlet;
   a circumferential row of fuel orifices located in the distributor body in flow communication with the main fuel circuit, each orifice extending in a substantially radial direction and communicating with the outer surface, wherein a cross section area of the main fuel circuit varies in the circumferential direction;
   wherein the distributor body and fuel conduits are monolithically formed as a single piece.

2. A combustor component according to claim 1 further comprising: an annular heat shield located at an axially aft end of the distributor body such that the heat shield is capable of shielding the distributor body from a flame located axially aft from the distributor body.

3. A combustor component according to claim 2 wherein the distributor body has a circumferential row of axial openings capable of flowing cooling air towards the heat shield.

4. A fuel nozzle comprising:
   the combustor component of claim 1, and
   an annular air swirler located radially inside the distributor body and capable of swirling an air stream entering the annular air swirler; and
   a fuel injector located radially inside the annular air swirler capable of injecting a stream of fuel into a mixing chamber such that the fuel and air are mixed within the mixing chamber.

5. A fuel nozzle according to claim 4 further comprising: an annular fuel distributor comprising a single monolithic element, the single monolithic element further comprising a center body having an annular outer wall surrounding the distributor body and having at least one circumferential row of openings corresponding to a plurality of fuel orifices located within the distributor body arranged circumferentially around the axis.

6. A fuel nozzle according to claim 5 further comprising: the at least one circumferential row of openings located on the outer wall capable of flowing cooling air over a portion of the outer wall.

7. A fuel nozzle according to claim 6 wherein the at least one circumferential row of openings are diffuser holes.

8. A fuel nozzle according to claim 4 further comprising:
   an annular heat shield located at an aft end of a center body such that the annular heat shield is capable of shielding the center body from a flame located axially aft from the center body.

9. A fuel nozzle according to claim 8 further comprising:
   at least one row of axial flow holes located on the center body capable of flowing cooling air towards the annular heat shield.

10. The combustor component of claim 1 further comprising:
    a circumferential row of fuel posts extending radially outward from the outer surface of the distributor body;
    a center body having an annular outer wall surrounding the distributor body, the annular outer wall of the center body spaced apart from the outer surface of the distributor body in a radial direction so as to define an annular passage for air flow between the outer wall and the distributor body, and having a circumferential row of openings, each opening aligned with one of the fuel posts;
    wherein each orifice extends in a substantially radial direction through one of the fuel posts; and
    wherein the distributor body, fuel conduits, and the center body are monolithically formed as a single piece.

11. The combustor component of claim 1 wherein the main fuel circuit includes two or more separate fuel paths, each fuel path extending in a circumferential direction within the distributor body and communicating with one of the fuel inlets and a plurality of the fuel orifices.

* * * * *